United States Patent [19]
Arnold

[11] Patent Number: 4,504,207
[45] Date of Patent: Mar. 12, 1985

[54] PRESSING APPARATUS FOR MAKING PARTICLEBOARD

[75] Inventor: Dieter K. Arnold, Darmstadt, Fed. Rep. of Germany

[73] Assignee: Carl Schenck AG., Fed. Rep. of Germany

[21] Appl. No.: 378,280

[22] Filed: May 14, 1982

[30] Foreign Application Priority Data

May 23, 1982 [EP] European Pat Off. ............ 81103987

[51] Int. Cl.[3] ............ A01J 21/00
[52] U.S. Cl. ............ 425/385; 425/394; 425/397
[58] Field of Search ............ 425/385, 394, 397

[56] References Cited

U.S. PATENT DOCUMENTS 3,096,545 7/1963 Rowland ............ 425/394
4,005,967 2/1977 Ayres et al. ............ 425/394
4,147,486 4/1979 Jahnle ............ 425/394

FOREIGN PATENT DOCUMENTS 2242399 7/1975 Fed. Rep. of Germany .
2545366 4/1977 Fed. Rep. of Germany .
2545624 12/1977 Fed. Rep. of Germany .
1703297 3/1978 Fed. Rep. of Germany .

*Primary Examiner*—James R. Hall
*Attorney, Agent, or Firm*—Connolly and Hutz

[57] ABSTRACT

A press for the production of particleboard from a preformed mat of wood particles and a suitable binder has spaced apart frames aligned one after the other and first and second parallel press platens movable toward and away from each other. The improvement comprises motivating structure connected between the first press platen and at least some of the frames for moving that platen to an extended position toward the second platen and against the preformed mat to thereby close the press. Dimensionally stable support structure positioned between the press frames and the first press platen maintains that platen at its extended position while preventing bending or arching thereof. Actuator structure connected between the press frames and the second press platen moves that platen toward the first platen and against the preformed mat while maintaining the second platen substantially parallel to the first to thereby press the preformed mat. Separating the press procedure into a closing step and a pressing step produces particleboards having a high degree of thickness precision.

4 Claims, 4 Drawing Figures

PRESSING APPARATUS FOR MAKING PARTICLEBOARD

BACKGROUND OF THE INVENTION

The present invention concerns a press for pressing wood particles and a suitable bonding agent into particleboard.

A press for executing a surface pressing procedure is known from Offenlegungsschrift No. 25 45 366, in which several frames aligned one after the other in spaced relationship constitute the support structure for a continuous press. Heated upper and lower platens connected to the support structure are arranged so that the distance between them is continuously decreased to a press opening corresponding to the thickness of the particleboard. The mass of wood particles on a suitable bonding agent is pressed between the platens until a constant thickness has been achieved, and hydraulically activated pistons are used to move the platens. For the production of particleboard, transport devices are also required for introducing mats of binder coated wood particles into the continuous press and for removing pressed particleboards therefrom. Such transports may encircle the upper and lower platens and be in the form of roller-flights, as shown for example in German Auslegeschrift No. 22 42 399.

In presses of this type, roller-flights leave impressions on the particleboard to be pressed, and in addition, maintaining the dimension of the press opening constant requires considerable expense since the constancy is maintained by means of hydraulic control. Use of the roller-flights according to German Auslegeschrift No. 24 45 624 does not prevent the impressions in the surface of the particleboard to be pressed, and the expense of the hydraulic control for keeping the press opening constant is high.

Likewise, a simple visible control of the required distance between the platens for manufacturing particleboard with practically constant thickness resulting from the hydraulic control of both platens cannot be obtained by means of discontinuously operating press platens, known from German Auslegeschrift No. 17 03 297 and each provided with self-compensating cylinder and piston devices. The press consists of one movable and one fixed press brace, between which one or several pairs of platens are arranged. Press posts are provided and each one consists of two columns and a connecting piece. Cylinder and piston mechanisms are provided at the long sides of the press braces, the press being characterized by compensation pistons provided between the fixed and the movable press brace and between the corresponding press platens.

SUMMARY OF THE INVENTION

On the basis of the above, the purpose of the present invention is a press that guarantees the avoidance of mutually influential errors due to hydraulic control of the press platens to thereby produce a particleboard of constant thickness. According to the invention, this problem is solved in that closing of the press is achieved by moving the first platen against the preformed mat of wood particles and bonding agent. The first platen is then mechanically fixed in place and thereafter the particleboard pressing is completed by moving the other platen toward the first platen and against the preformed mat. This procedure avoids the mutual adjustments between the hydraulic systems of one and the other of the platens required in the pressing procedures. Thus, by means of this new pressing procedure, a particleboard with a very high degree of precision of thickness is produced, namely due to the separation of the procedure into one closing process step and a subsequent mechanically fixed retention of the platen used in this step of the procedure. Thereafter pressure is applied to the other platen which cooperates with the first platen. The particleboard to be pressed is located between the platens.

A press according to the present invention has several frames in line one after the other and opposite heated and movable press platens. Wood particles and a suitable bonding agent are formed into particleboards under the influence of pressure and temperature. One heated press platen is moved by a small number of hydraulic actuators and a support structure is then positioned between the frame and that heated press platen to prevent it from bending or arching. The other heated press platen is supported directly on the frame of the press by means of a plurality of hydraulic actuators and this press platen produces the pressing force. The press according to the invention produces particleboard with exact thickness without the necessity of adjusting the pressure of both press platens. Maintaining the pressures of both platens constant over a certain time has hitherto been possible but only with considerable expenditures and even then only incompletely or with resulting surface faults in the finished product.

In the present invention, the only required control is the number of hydraulic actuators that cooperate with the second press platen to maintain the surface thereof in close tolerance parallel relationship with the surface of the first platen during the pressing operation. The surface of the first press platen is prevented from arching by the support structure while the surface of the second press platen is prevented from arching by the hydraulic actuators.

Such control eliminates the principal deficiency of prior presses to date, namely that due to the arching of both press platens, it is not possible to precisely measure the distance between the central areas of the two independently bulging and guided press platens (normal platen presses generally have press platen dimensions of 2.5 m width and 8 m length). By introducing dimensionally fixed support structure between the frame and the upper heated press platen, or between the brace carrying that press platen and the frame, a significant increases in its resistance to arching is achieved. A practically flat press platen surface is obtained. Furthermore, the quantity of required hydraulic fluid can be reduced to a small degree in comparison to conventional presses.

In the execution of the press according to the invention, it is suggested that the dimensionally fixed support structure consist of metal structure of honeycomb design having planar and parallel end surfaces. Thereby, a light construction of the press is obtained and the upper heated press platen can be made thin without danger of penetration by the support structure. This type of dimensionally stable support structure for the upper heated press platen adds practically no extra load. In addition to the honeycomb support structure which fixes and retains the upper press platen, other shimlike support structures may be utilized, namely wedges, stop wedges, threaded spindles, racks and the like. If one uses the group of honeycomb support structures, wedges, and step wedges where each one has a parallel end surface as a contact surface with the press frame and brace, or with the top side of the press platen, each one of these support structures will be connected without dimensional change to the frame and the brace or to the press platen by means of a small number of hydraulic actuators that exert the desired pressure. If threaded spindles or racks are used between the frame and brace or press platen, the set distance between the frame and press platen is generated by means of the small number of hydraulic actuators, and this distance is subsequently fixed and retained by moving the threaded spindles in bolts or the racks in pinions.

In the press according to the invention, it is suggested that the height of the dimensionally stable support structure be variable in relation to the elevations of the existing hydraulic actuators, as these result from the desired thickness of the particleboard. The effect of this would be that even when particleboards and similar products are produced from different types of wood, different types of chips, and different board thicknesses, no costly control is required for the small number of hydraulic actuators generating the closing process. A support structure for a greater or lesser fixed and true distance can be obtained merely by exchanging one honeycomb support structure for another, or by changing the height of that same support structure if composed of wedges, step wedges, threaded spindles, or racks.

The invention thus describes an apparatus for pressing wood particles and a suitable bonding agent into particleboards, whereby a discontinuously operating lightly constructed press can be used, preferably as a single level press. Furthermore, the control of the hydraulic actuators is significantly simplified by using known position sensing devices which are applied in or next to the actuators and are capable of measuring the distance between the lower surface of the upper fixed heated press platen and the upper surface of the lower heated press platen. In addition, considerable savings result from the reduced quantity of hydraulic fluid which is needed in comparison to prior presses.

If the press according to the invention is also used as a pre-press for preliminary pressing of the wood particles and suitable bonding agent, then the hydraulic actuators holding the upper heated press platen are first set at the maximum travel provided for this use. This causes the lower surface of the upper heated press platen to rest on the wood particles and suitable bonding agent with a specific pre-pressure. After introducing the dimensionally stable support structure between the aligned frames and the top side of the upper brace or the upper press platen, the preliminary pressing continues with practically identical pressure through the honeycomb support structure, and a stable, even support surface is simultaneously created for the subsequent finishing press procedure which will be executed by means of the hydraulic actuators alone. According to the length of the press, several frames are arranged after one another, whereby the frames are mutually aligned.

The following percentage distribution of hydraulic actuators has proven particularly advantageous: 5% of the hydraulic actuators connected to the upper press platen and 95% connected to the lower platen. Similarly, for a 16 mm thick pre-pressed particleboard made from evergreen wood particles and a suitable bonding agent, the ratio of vertical movement of the hydraulic actuators connected to the lower press platen relative to the hydraulic actuators connected to the upper press platen has been found to be 1:2. It is obvious that the relative vertical movement of the hydraulic actuators depends upon the type of wood, the type of wood particles, and the thickness of the particleboard.

BRIEF DESCRIPTION OF THE DRAWING

Novel features and advantages of the present invention in addition to those mentioned above will become more apparent to those skilled in the art from a reading of the following detailed description in conjunction with the accompanying drawing wherein similar reference characters refer to similar parts and in which.

DETAILED DESCRIPTION OF THE INVENTION

Figure 1:
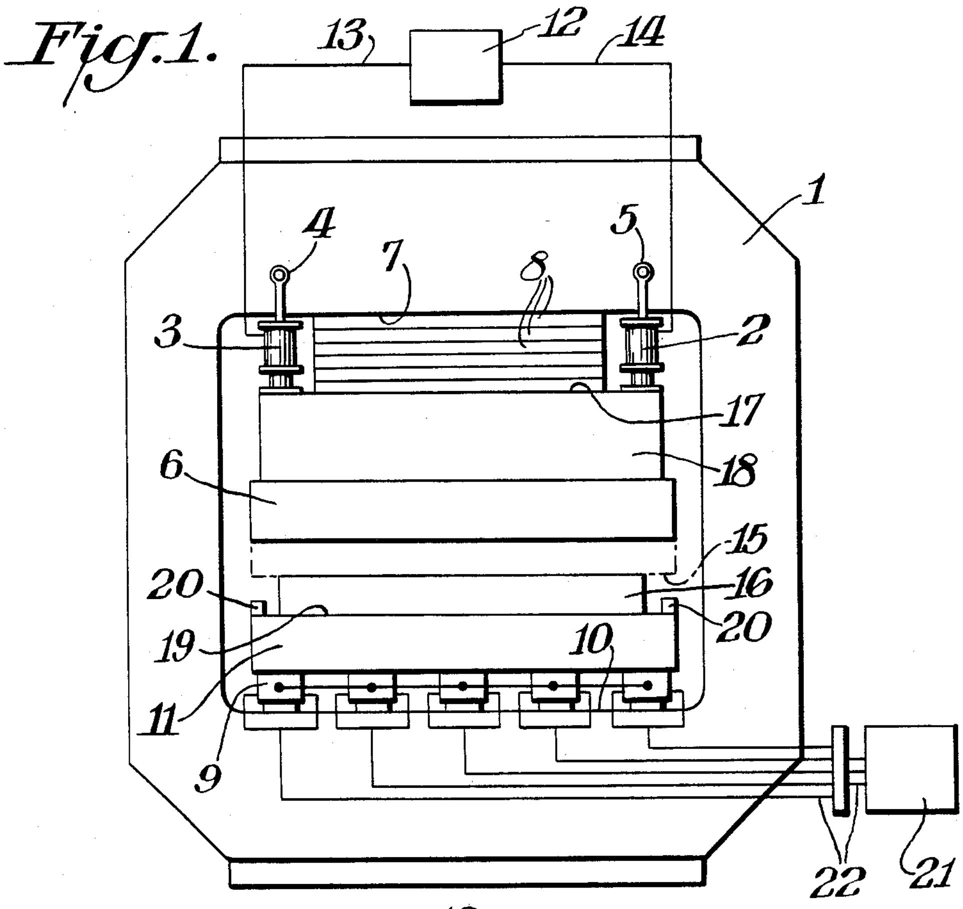
FIG. 1 is a schematic front elevational view of a closed framework for a press, according to the present invention, with the press in its open position.
Figure 1A:
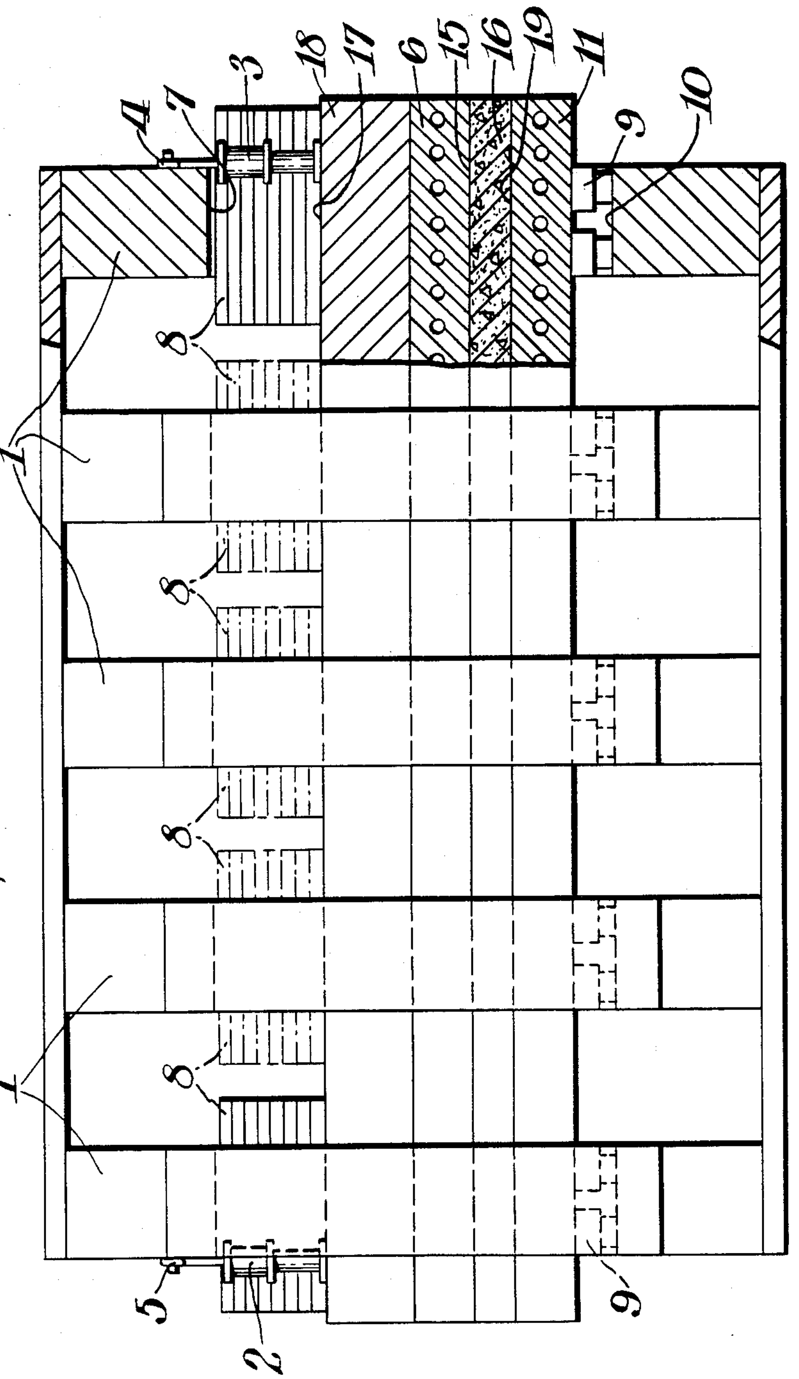
FIG. 1A is a side elevational view of the press shown in FIG. 1, with the press in its closed position and portions thereof broken away to show details.

In FIG. 1, an individual frame 1 is shown from a frame press consisting of several frames aligned one after the other in spaced apart relationship. The upper hydraulic actuators 2,3 of the press are attached at locations 4,5 on the frame 1. For the movement of a heated upper platen 6, it is not necessary that an upper hydraulic actuator pair 2,3 be provided on each frame 1. Instead, it has been proven particularly advantageous to provide an upper hydraulic actuator pair 2,3 on every fifth frame, as shown best in FIG. 1A. The frames 1 are aligned over the entire length and width of the frame press and each has an inner side 7, against which a support structure 8 is applied. By contrast, there is a greater number of hydraulic actuators 9 between lower surface 10 of each of the successive frames 1 and the lower platen 11. These function to limit bending movement of platen 11 in a downward direction during the pressing procedure. The lower surface 10 on the frame 1 must be aligned within each frame 1 but not with other frames. The heated lower platen 11 rests directly on the hydraulic actuators 9.

In the press procedure, a preformed mat 16 of wood particles and a suitable bonding agent is positioned in the press between platens 6, 11, and hydraulic fluid such as oil is delivered from an oil container 12 via lines 13,14 to the upper hydraulic actuators 2,3. Thereby, the heated upper platen 6 moves downwardly until its lower surface 15 is positioned as represented with broken lines in FIGS. 1 and 2. As represented in FIG. 1, such movement causes a certain preliminary pressure on the mat 16 to be pressed. Subsequently, the support structure 8 is inserted between the inside 7 and the top surface 17 of the brace 18 carrying the upper platen 6. The support structure 8 comprises a plurality of stacked panels, each consisting of a honeycomb inner web between opposed planar and parallel faces. The number of individual panels depend upon the extension of the upper press platen 6. After retracting the upper hydraulic actuators 2,3, the support structure 8 remains fixed between surfaces 7 and 17 and the lower surface 15 of the heated upper platen 6 is maintained planar. This position of the lower surface 15 is now maintained as the zero position for the subsequent completion of the pressing procedure.

In the simplest case, it is sufficient if on each side of the upper surface 19 of the lower platen 11 there is a position sensing device 20 which constantly monitors the distance between the upper surface 19 of the lower platen 11 and the lower surface 15 of the upper platen 6 during the pressing procedure. The sensing device may be a common inductive pickup, for example.

In accordance with the information from the position sensing device 20, hydraulic fluid from hydraulic mechanism 21 is delivered to the hydraulic actuators 9. A parallel position of the lower platen 11 relative to the upper platen 6 is thereby maintained.

Figure 2:
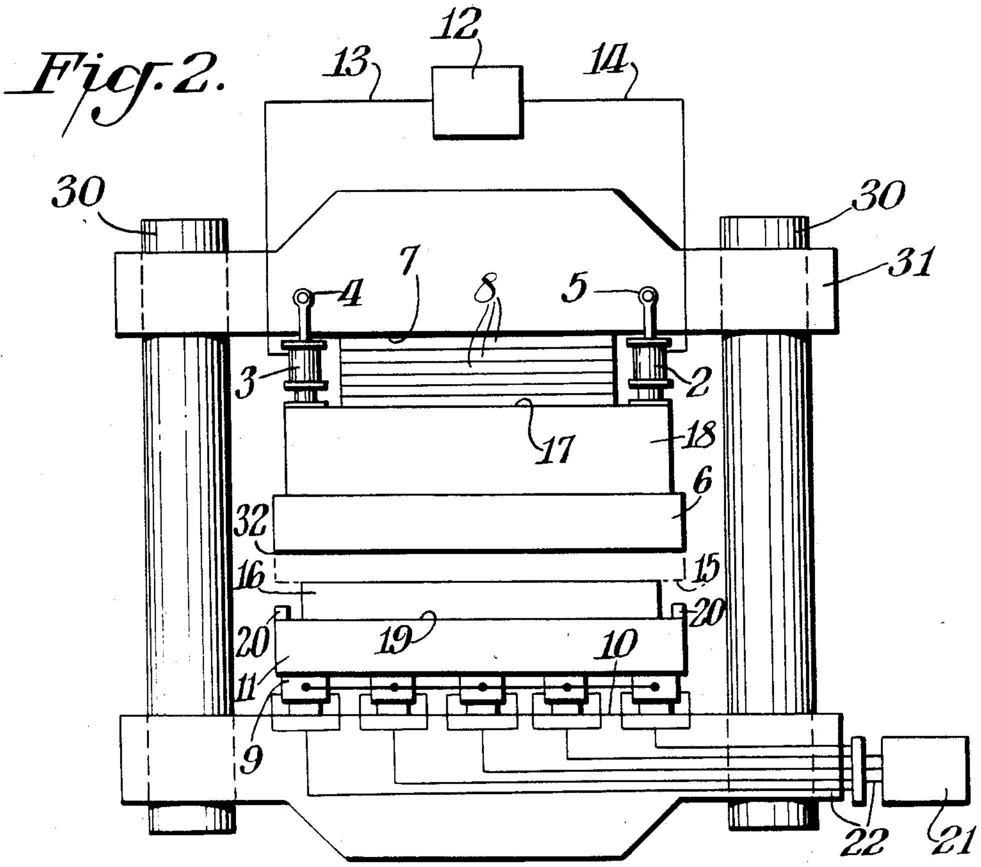
FIG. 2 is a schematic front elevational view of a column framework for a press, according to the present invention, and comprising an alternate embodiment thereof.
Figure 3:
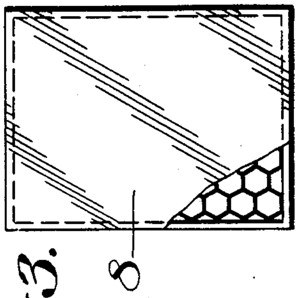
FIG. 3 is a plan view of a shim with portions thereof broken away to show the internal honeycomb structure.

FIG. 2 represents one column press frame of a press consisting of several column press frames aligned one after the other in spaced apart parallel relationship. Construction details identical with those in FIG. 1 have been given the same numerical identification. An upper yoke 31 is connected to both columns 30. A brace 18 is between the upper hydraulic actuators 2,3 and the upper heated press platen 6. After the platen 6 moves from position 32 to its extended position, dimensionally stable support structure 8 is introduced between the upper fixed yoke 31 and the brace 18 to prevent the platen 6 from arching. Next, the lower platen 11 is moved toward the lower surface 15 of the upper platen 6. This is accomplished by the plurality of hydraulic actuators 9 of which there are some 500 for a press platen size of 2,500–8,000 mm.

Here, as well, a high pressure hydraulic mechanism 21 is connected via lines 22 with the hydraulic actuators 9 for purposes of completing the pressing procedure.

The above described press produces particleboard of constant thickness. Closing of the press is accomplished by moving the first press platen against the preformed mat of wood particles and bonding agent. The first platen is then mechanically fixed in place by the dimensionally stable support structure 8, and thereafter the particleboard pressing is completed by moving the second platen toward the first platen and against the preformed mat. Particleboard having a very high degree of precision of thickness is produced due to separation of the overall procedure into one press closing step with mechanically fixed retention of the platen used in this closing step. Thereafter pressure is applied to the other platen to actually press the preformed mat into particleboard.

I claim:

1. In a press for the production of particleboard from a preformed mat of wood particles and a suitable binder, the press having spaced apart frames aligned one after the other and first and secnd parallel press platens movable toward and away from each other, the improvement comprising motivating means connected between the first press platen and at least some of the frames for moving the first press platen to an extended position toward the second platen and against the preformed mat to thereby close the press, support structure between the press frames and the first press platen for maintaining the first platen at its extended position while preventing bending or arching thereof, and actuator means connected between the press frames and the second press platen for moving the second platen toward the first platen and against the preformed mat while maintaining the second platen substantially parallel to the first to thereby press the preformed mat.

2. A press as in claim 1 wherein the support structure between the press frames and the first press platen comprises stacked panels, each consisting of a honeycomb inner web between opposed planar and parallel faces.

3. A press as in claim 1 wherein the motivating means comprises hydraulic actuators connected between the first press platen and at least some of the frames.

4. A press as in claim 1 wherein the actuator means comprises a plurality of hydraulic actuators.

* * * * *